Oct. 6, 1931.  G. W. ANDERSON  1,826,269
ELECTROMAGNETIC VALVE
Filed Sept. 26, 1928  2 Sheets-Sheet 1

INVENTOR:
GABRIEL W. ANDERSON,
By
Fad W Harris
ATTORNEY.

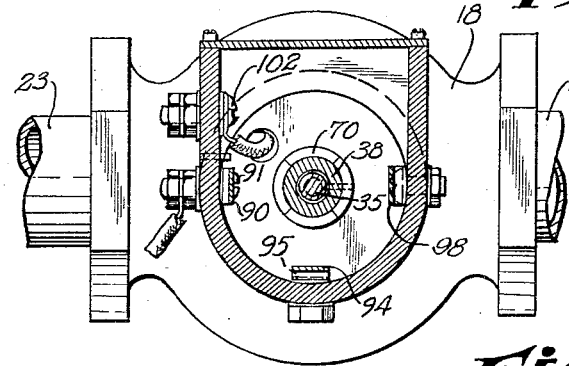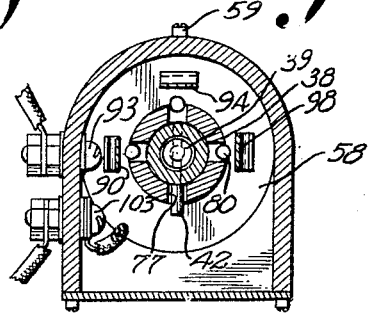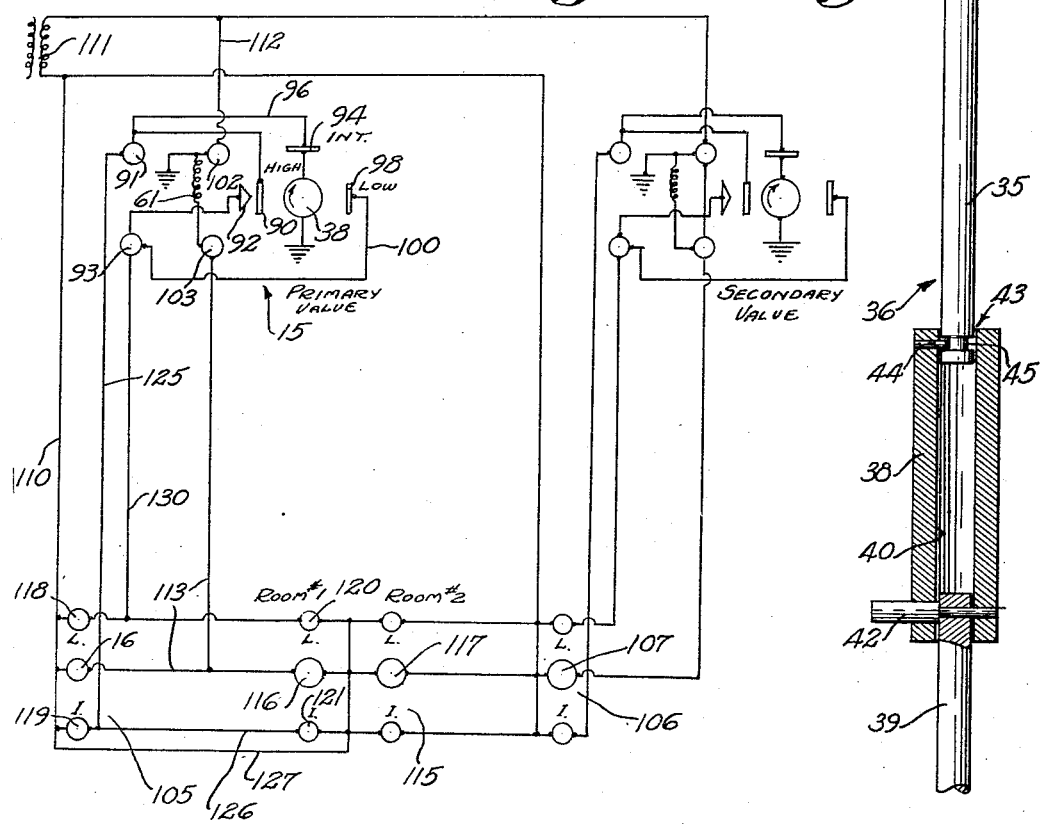

Patented Oct. 6, 1931

1,826,269

UNITED STATES PATENT OFFICE

GABRIEL W. ANDERSON, OF CHULA VISTA, CALIFORNIA, ASSIGNOR TO GAS FURNACE CONTROL CO., A CORPORATION OF CALIFORNIA

ELECTROMAGNETIC VALVE

Application filed September 26, 1928. Serial No. 308,411.

My invention relates to valve structures, and more particularly to a magnetically operated valve which may be controlled from a remote point to regulate the flow therethrough.

It is often desirable to vary the flow of a gas or other fluid by a valve controlled from a remote point. For instance, many residences and other buildings are now equipped with gas furnaces positioned a distance from the room to be heated. In such installations it is desirable to be able to control the amount of heat from the room to which the heat is delivered or from a central point.

It is an object of this invention to provide a heating system for a plurality of rooms, the heat supplied to any room being controlled by a valve structure operable from this room or from a central point.

Various types of remotely controlled valves have been devised, but all have been open to certain disadvantages and inherent limitations.

It is an object of this invention to provide an improved type of remotely controlled valve which will not stick or become otherwise clogged, and which will. be positive in operation and which will yet pass a gas or liquid with the least possible resistance.

My valve comprises a plunger reciprocable by magnetic means, this plunger having a valve member adapted to engage a valve seat. The distance between the valve member and the seat determines the amount of gas or other fluid passing through the valve, this distance being in turn determined by a pair of cam members, one of which has slots of variable effective length in which a guide member of the plunger slides.

It is an object of my invention to provide a valve operated by a solenoid, successive energization of which causes the valve to open different predetermined distances, these distances being readily variable.

A further object of my invention is to provide a pair of stationary cam members for partially rotating a plunger of a valve, these cam members providing grooves, the length of which determines the maximum positions of the plunger after each energization of the solenoid actuating the plunger.

Still another object of my invention is to provide a plunger-operated valve member connected to the plunger of a valve by a swivel-joint so that no rotation of the plunger is transmitted to the valve member.

The mechanism of my invention may be put to other uses than the one to be particularly described. Thus, for instance, this mechanism is useful in determining the maximum return-position of a reciprocable member, and it is a further object of my invention to provide a novel device for adjustably determining the forward or return-position of a reciprocating member.

A further object of my invention is to provide a device which will control a series of return-positions of a reciprocable member in a definite sequence.

Further objects and advantages of my invention will be made evident hereinafter.

Referring to the drawings, in which I illustrate my invention as applied to a remotely controlled valve structure,—

Fig. 4 is a sectional view taken on the line 4—4 of Fig. 2.

Fig. 5 is a sectional view taken on the line 5—5 of Fig. 2.

Fig. 6 is a detailed view, partially sectioned, illustrating the plunger of my invention.

Fig. 7 is a wiring diagram of the preferred method of connecting two of the valves in my invention.

Figure 1:
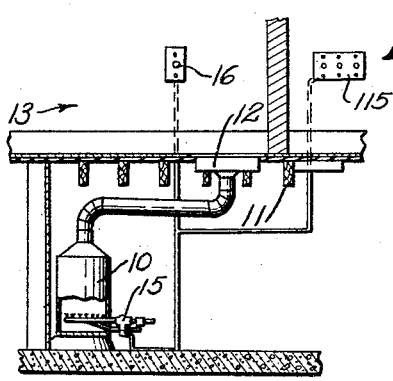
Fig. 1 is a utility view illustrating this valve of my invention applied to a furnace.

Referring particularly to Fig. 1, I have illustrated a gas furnace or other heater 10 situated in a basement of a building structure 11 and supplying heat through a register 12 to a room 13. The amount of heat developed in the furnace 10 is controlled by the gas flow through a valve 15 of my invention, this valve being magnetically operated by depressing a push button 16 situated in the same room as the register 12, or by depressing a push button of a master switch to be hereinafter described, this master switch situated in another part of the building structure 11. I prefer to utilize a separate heater 10 for each of the rooms, each heater being only of sufficient size to economically heat the room to which it is piped. Each heater has its own individual control switch in the room which it heats, and may be also controlled from a master switch XX situated at any convenient point in the building.

The details of the valve 15 are best illustrated in Figs. 2 to 6, inclusive. Referring to these figures, the valve 15 has a valve body 18, the upper end of which is hollow, this end having a partition wall 19 extending thereacross, in a manner best illustrated in Fig. 2. This partition wall divides the upper portion of the valve body 18 into an intake passage 20 and an exhaust passage 21, these passages being respectively in communication with a supply pipe 22 and a delivery pipe 23, the latter pipe communicating with a burner of the heater 10.

Formed in the partition wall 19 is an opening 24 which provides a valve seat 25 against which a valve member 26 is resiliently held by the force of gravity acting on the mass of the valve member. In certain instances it is desirable to supplement this gravitational force by the action of a compression spring 27, the purpose of which will later be described. This compression spring extends across the intake passage 20, the upper end being retained in a plug 29 threaded into an opening 30 of the body 18. The opening 30 is of sufficient diameter so that the valve member 26 may be removed therethrough.

The valve member 26 preferably has an annular ring 32 therearound, this ring being preferably formed of leather and held in place by any suitable means. This leather ring 32 forms a tight fit with the seat 25 when the valve member 26 is in its full line position indicated in Fig. 2. However, this leather ring may be entirely dispensed with and the valve member 26 provided with a metallic surface which comes into engagement with the valve seat 25.

Figure 3:
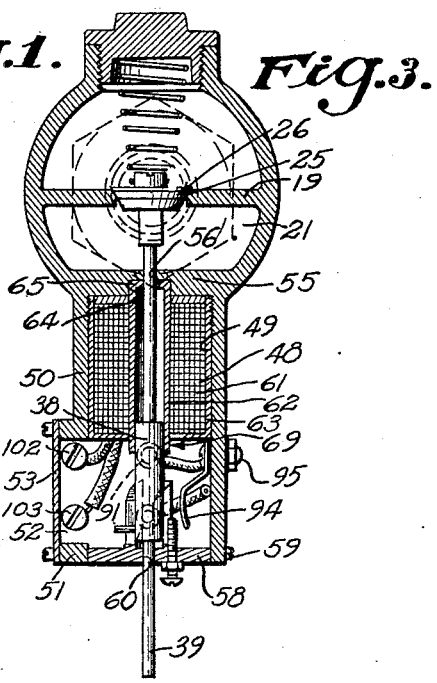
Fig. 3 is a sectional view taken on the line 3—3 of Fig. 2.

Extending loosely into a cavity 33, formed in the exhaust-passage side of the valve member 26, is the upper end of a stem 35, this stem forming a portion of a plunger 36, best illustrated in Figs. 3 and 6. This plunger includes, in addition to the stem 35, an armature 38 formed of magnetic material, and a rod 39, the rod and stem being preferably formed of non-magnetic material.

The means for connecting the elements of the plunger 36 together are best illustrated in Fig. 6, which illustrates a longitudinal bore 40 formed through the armature 38. One end of the rod 39 is held in one end of this bore by a pin or guide member 42 which passes through the armature and through an opening in the rod 39. The end of this guide member extends a distance from the armature 38 for a purpose to be described. The armature 38 and the stem 35 are connected together by swivel-connecting means indicated by the numeral 43, this means comprising an inward extending pin 44 carried by the armature 38, the inner end of this pin extending into an annular channel 45 formed in the lower end of the stem 35. This type of joint permits the stem 35 to be turned relative to the armature 38, but prevents any relative longitudinal movement therebetween.

The plunger 36 and the valve member 26 cooperate to form a valve structure 46 which is magnetically operated by the energization of a solenoid 48 to cause a separation of the valve member 26 and the seat 25, this action taking place against the force of gravity acting on the valve structure, and against the spring 27.

The solenoid 48 is suitably mounted in a bore 49 of a cylindrical portion 50 of the valve body 18, this cylindrical portion extending downward and terminating in a U-shaped box 51 having an opening 52 closed by a cover plate 53.

A wall 55 separates the exhaust passage 21 and the bore 49, this wall having an opening 56 which journals the stem 35. The lower end of the bore 49 is closed by a plate 58 suitably held in place as by screws 59. This plate has an opening 60 which slidably journals the rod 39.

The solenoid 48 is preferably formed by forming windings 61 on a core 62 formed of non-magnetic material, these windings being encased in a case 63. I prefer to form the upper end of the core 62 long enough so that it extends through the case 63 and into a counterbored portion 64 of the opening 56 so that a packing means 65 in the form of a washer of felt or other packing material is held in place in the counterbore 64 by the upper end of the core 62. This packing means prevents any flow of gas from the exhaust passage 21 through the core 62. The inner diameter of the core 62 is slightly larger than the outer diameter of the armature 38 so that this armature may easily slide therein.

Substantially the whole length of the armature 38 is below the windings 61 when the valve member 26 engages the seat 25, as best shown in Fig. 3, so that when the solenoid 48 is energized, the armature is drawn upward and the valve member 26 unseats.

The lower end of the core 62 also extends beyond the case 63, this lower end forming a primary cam member 69 having, in the preferred embodiment illustrated, four equally spaced notches 70 cut therein, these notches providing primary cam surfaces 71 which are engageable by the guide member 42 when the valve structure 46 moves upward under the action of the solenoid 48. Each of the notches 70 has a vertical face and a sloping face intersecting at the bottom of the notch.

Extending upward from the plate 58 is a secondary cam member 73 having, in the preferred embodiment, four equally spaced notches 74 formed therein, these notches being disaligned with the notches 70 of the primary cam member 69. The notches 74 provide secondary cam surfaces 75 along which the guide member 42 slides when dropping downward from engagement with the primary cam member 69, after the solenoid 48 has been de-energized.

Each of the notches 74 is also formed with a vertical face and a sloping face, these faces being separated by a longitudinal slot 77 extending to a point adjacent the upper edges of the plate 58. These slots cooperate in forming the notches 74 and also cooperate in providing the secondary cam surfaces 75 previously described.

The effective depth of each slot 77, and thus of each notch 74 of the secondary cam member 73, is determined by the position of the ends of a plurality of adjustable members 80 which pass through the plate 58 and extend into three of the slots 77. In the preferred embodiment of my invention I have illustrated these adjustable members as comprising machine screws threadedly received by the plate 58 and locked in place by nuts 81 threaded thereon and bearing against the plate.

Figure 2:
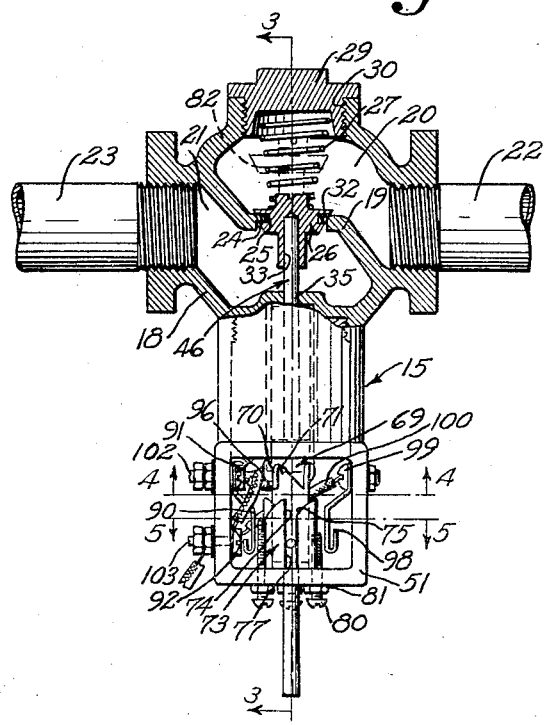
Fig. 2 is a side view, partially broken away, of the valve of my invention.

One of the slots 77 does not contain an adjustable member 80, and when the guide member is in this slot, the spring 27, together with the weight of the valve structure 46, forces the valve member 26 downward until it engages the seat 25, thus entirely closing the valve 15. The position of the guide member 42 at this instant is illustrated in Figs. 2 and 3.

If, now, the solenoid 48 is energized, the valve structure 46 will be moved upward due to the attraction of the solenoid on the armature 38, thus momentarily opening the valve structure and allowing the gas to enter the burner of the furnace, the valve member 26 assuming a position indicated by dotted lines 82 during the energization of the solenoid.

Due to the notches 70 and 74 being disaligned, the guide member 42 will rise from the slot 77 and will strike the primary cam surface 71, the point of contact between the guide member 42 and this cam surface being on a sloping face of the notches 70. A further upward movement of the valve structure 46 after this contact takes place, will cause the armature 38 and rod 39 to be turned through a small angle until the guide member 42 rests in the bottom of one of the notches 70.

It should be understood that this rotation of the armature and guide member is not transmitted to the valve member 26 due to the swivel-connecting means 43, and to the resistance to rotation of the valve member offered by the spring 27.

When the solenoid 48 is de-energized, the valve structure 46 drops downward until the guide member 42 comes into contact with the secondary cam surface 75, this contact taking place on the sloping face of one of the notches 74, so that the armature and rod are again turned through a small angle until the guide member 42 drops into the slot 77 formed at the bottom of the notch in which it now rests.

The lowermost position of the valve structure 46 is determined when the guide member 42 contacts the adjusting member 80 in this particular slot. The position of this adjusting member thus determines the relative position of the valve member 26 and seat 25. The position now occupied by the valve mechanism will be hereinafter referred to as a "high" position.

If, now, the solenoid 48 be again energized, the valve structure 46 will be moved upward and the guide member 42 will move into the bottom of that notch 70 directly above the slot in which it formerly was positioned. The de-energization of the solenoid will allow this valve structure to drop so that the guide member 42 contacts the secondary cam surface 75 which moves this guide member into the next slot. The effective depth of this slot is, of course, determined by the position of the adjustable member 80 which, in turn, determines the separation between the valve member 26 and the seat 25. This position will be hereinafter termed an "intermediate" position.

Similarly, a third energization and de-energization of the solenoid will cause the guide member 42 to be moved into the next slot 77 until it contacts the adjustable member 80 therein, the valve structure 15 then being in what I have termed a "low" position.

The fourth time that the solenoid 48 is energized and de-energized, the guide member 42 will move into the original slot which contains no adjustable member 70, thus putting the elements of the valve structure into an "off" position.

As the guide member 42 is moving into the slot 77 which defines the "high" position of the elements of the valve, this guide member contacts a contact blade 90 mounted by a bolt 91 extending through the box 51, this bolt being insulated from the box in a manner best illustrated in Fig. 4. This engagement between the guide member 42 and the contact blade 90 moves this blade into engagement with a contact 92 in electrical connection with a bolt 93 insulated from the box 51, this bolt being illustrated in Fig. 5.

As the guide member 42 moves into the next slot, in which slot the valve elements maintain their "intermediate" position, this member engages a secondary contact blade 94 which is electrically connected to, and held in place by, a bolt 95 suitably insulated from the valve body 18. This secondary contact blade 94 is in electrical connection with the bolt 91 by means of a wire 96.

When the guide member 42 moves into the slot in which the valve elements are in their "low" position, this member engages a tertiary contact blade 98 which is in electrical connection with, and held in place by, a bolt 99 insulated from the valve body 18. The bolt 99 is in electrical connection with the bolt 93 by a wire 100.

When the guide member 42 is in the slot 77 in which no adjusting member 80 is positioned, and at which time the valve elements are in an "off" position, this guide member does not make any electrical contact.

The winding 61 of the solenoid 48 is connected between bolts 102 and 103, the latter bolt being insulated from the valve body, while the former bolt is grounded thereto. It should be understood that the valve structure 46 is also grounded to the valve body, due to the contact between this body and the valve structure.

These electrical connections are clearly indicated in Fig. 7. In this figure I have illustrated the electrical connections for two of the heaters 10, one of these heaters being controlled by an individual switch 105 on which the push button 16 is positioned, this heater being controlled by the valve 15 previously described. The second heater is controlled by a similar valve, and to distinguish these valves I have termed the valve 15 a primary valve and the other valve a secondary valve. The secondary valve is controlled by an individual switch 106 by means of a push button 107.

These push buttons may be of any type in which a circuit is completed therethrough when the push button is depressed. The push button 16 is connected by a wire 110 to one terminal of the secondary of a transformer 111, the other terminal of this transformer being connected by a wire 112 to the bolt 102 which is also grounded. The bolt 103 is connected by a wire 113 to the push button 16, so that when the button 16 of the switch 105 is depressed, current will pass through the solenoid winding 61 as long as the push button 16 is depressed, this solenoid being deenergized when the push button is released.

Similarly, the depression of the push button 107 of the switch 106 acts to energize the solenoid winding of the secondary valve.

The individual switches 105 and 106 are preferably positioned in the rooms supplied by heat from the heaters which they respectively control. It is also desirable to provide a central or master switch 115 whereby the valve means of any heater may be controlled. Such a central master switch is illustrated in Figs. 1 and 7, this switch having push buttons 116 and 117 connected respectively in parallel with the switches controlled by the push buttons 16 and 107.

In order that the operator may ascertain the exact position of the valve mechanism, I provide indicating means in the form of lamps, there being two lamps at each individual switch, and four or more lamps at the master or central switch depending on the number of heaters utilized. The lamps at the individual switch 105 are numbered 118 and 119, these lamps being respectively termed a "low" lamp and an "intermediate" lamp. Similar "low" and "intermediate" lamps 120 and 121 are positioned adjacent the push button 116 at the master switch 115.

In Fig. 7, I have illustrated the guide member 42 as contacting the secondary contact blade 94, thus completing a circuit from the secondary of the transformer through the valve body 18 and the armature 38, through the guide member 42, the secondary contact blade 94, the wire 96, and the bolt 91, the current then passing through a wire 125 to the "intermediate" lamp 119, whence it returns to the transformer through the wire 110.

A parallel path for this current is also formed through a wire 126 which connects to the "intermediate" lamp 121 of the master switch 115, and through a wire 127 connected to the wire 110. Thus, when the guide member 42 is in this position, the "intermediate" lamps 119 and 121 will be lighted.

When either of the push buttons 16 or 116 are depressed, the guide member will move into contact with the tertiary contact blade 98, thus sending current from the transformer through this contact and through the wire 100, the bolt 93, and through a wire 130. From this point the current may divide between the "low" lamps 118 and 120 returning to the transformer through the wire 110.

Another depression of either of the push buttons 16 or 116 will cause the valve mechanism to assume its "off" position, at which time none of the lamps 118, 119, 120, or 121 are lighted.

When the solenoid 48 is again energized the guide member 42 will first contact the primary contact blade 90, thus sending current through a circuit which includes the bolt 91 and the "intermediate" lamp 119. As the primary contact blade 90 moves into engagement with the contact blade 92 current is also sent through the bolt 93 and the "low" lamps 118 and 120.

Thus, when the lamps 118 or 120 are lighted, the operator knows that the valve is in a "low" position. When the lamps 119 and 121 are lighted, the operator knows that the valve is in an "intermediate" position. When all of these lamps are lighted, it is an indication that the valve is in wide-open or "high" position. These positions of the valve may be ascertained either at the individual switch or at the master switch, and the valve may be changed from one position to the other from either of these switches.

The wiring diagram for the secondary valve is exactly similar to that of the primary valve and need not here be described. This secondary valve is equipped with lamps performing a similar function to those just described.

My invention should not be limited to the particular sequence of positions described in this application, this sequence being merely one of a number of possible combinations. It is desirable that the number of lamps be reduced to a minimum and this is accomplished by the system of wiring indicated. Neither am I limited to the use of any particular number of positions of the valve mechanism, this number being controlled only by the number of notches in the primary and secondary cam members.

While the use of adjustable members in all of the slots except one is desirable, I am not limited to this number. Neither am I limited to the particular type of adjustable members shown. In fact the slots 77 may be so formed as to inherently have different effective depths, this system being desirable when adjustability can be dispensed with.

The use of the spring 27 is not absolutely necessary to this invention, this spring forming an auxiliary element which serves to maintain the valve member 26 in contact with the seat 25 when the valve is in an "off" position, even though the valve structure 46 should drop to a position wherein the stem 35 is slightly withdrawn from the socket 33 of the valve member. By proper proportioning, it is possible to entirely dispense with this spring and utilize the force of gravity in closing the valve, it being understood that the pressure in the intake chamber 20 normally tends to hold this valve member in contact with the seat 25. In the event that the spring 27 is dispensed with, it is desirable to secure the stem 35 and the valve member 26 together in fixed relationship.

I have found the particular structure described to be very effective to eliminate any tendency to stick which is encountered in electrically magnetically operated valves at present on the market. However, my invention should not be limited to the exact design shown.

The mechanism of my invention also finds utility in other fields besides that of magnetically operated valves, and I should not be limited to this use. The arrangement of slots and adjusting members is useful in any combination of elements wherein one or more maximum positions of a reciprocating element should be made adjustable, or in which these maximum positions are to be developed in a definite sequence.

The ease of adjustment of my valve should be apparent. With the mechanism illustrated it is possible to accurately adjust the amount of flow during the time that the guide member is in any particular slot without the necessity of cut-and-try methods of adjustment utilized in certain other types of valves at present in use.

I claim as my invention:

1. In an electrically operated valve, the combination of: a valve body providing a seat therein; a plunger member normally engaging said seat; electromagnetic means for moving said plunger member away from said seat; stationary cam surfaces carried by said valve body; a guide member carried by said plunger member and adapted to successively engage said cam surfaces to partially rotate said plunger member when said electromagnetic means is energized; and adjustable means for determining the maximum position to which said plunger member moves after each partial rotation thereof.

2. A combination as defined in claim 1 in which said plunger member includes a plunger and a valve member, said valve member being adapted to engage said seat, and also including a swivel-connecting means between said plunger and said valve member for preventing the transfer of any rotative movement of said plunger to said valve member.

3. In an electrically operated valve, the combination of: a valve body providing a seat therein; a plunger member normally engaging said seat; electromagnetic means for moving said plunger member away from said seat; primary and secondary cam members carried by said valve body; a guide member carried by said plunger member and adapted to successively engage said cam members to partially rotate said plunger member when said electromagnetic means is energized; and adjustable means for determining the maximum position to which said plunger member moves after each partial rotation thereof.

4. In an electrically operated valve, the combination of: a valve body providing intake and exhaust passages separated by a partition wall; a valve seat in said wall; a valve member adapted to engage said seat; a spring normally acting to hold said valve member in engagement with said seat; a solenoid having a plunger, said plunger being connected to said valve member in a manner to separate said valve seat and said valve member when said solenoid is energized; a pair of cam members, one of said members having slots therein of different effective depth; and a guide member adapted to move along said cam surfaces and to successively enter each of said slots when said solenoid is successively energized, the effective depth of said slots determining the maximum positions to which said plunger may return under the action of said spring.

5. A combination as defined in claim 4 in which said plunger is rotatably connected to said valve member so that no rotative movement of the former will be transmitted to the latter.

6. In combination: a body; primary and secondary cam members in said body, at least one of said cam members having a plurality of slots therein of different effective depths; a guide member adapted to engage said cam members and successively enter said slots; a rod reciprocable relative to said body to move said guide member successively into said slots, and adjustable members extending into said slots to determine the maximum distance said rod may move after each reciprocation.

7. In a valve structure the combination of: walls defining a plurality of slots disposed around an axis; a plunger reciprocable along said axis; a guide member on said plunger; means for moving said guide member successively into said slots; and adjusting members extending into said slots to determine the maximum position of said guide member therein.

8. In a valve structure the combination of: walls defining a plurality of slots disposed around an axis; a plunger reciprocable along said axis; a guide member on said plunger; means for moving said guide member successively into said slots; adjusting members extending into said slots to determine the maximum position of said guide member therein; and valve means operated by said plunger and opening as a function of the position of said plunger.

9. In a valve the combination of: walls defining a valve seat; a valve member cooperating with said valve seat in controlling the amount of fluid passing through said valve; a plunger operatively connected to said valve member; a valve body in which said plunger moves; means for moving and partially rotating said plunger from a primary position to a secondary position; and means adjustable exteriorly of said valve body for adjusting the secondary position of said plunger.

10. A combination as defined in claim 9 in which said last mentioned means comprises a screw threaded into said body in a position to be contacted by a portion of said plunger when in said secondary position.

11. In an electrically operated valve, the combination of: a valve body providing a seat therein; a plunger member normally engaging said seat; electromagnetic means for moving said plunger away from said seat; primary and secondary cam members carried by said valve body, said cam members having disaligned notches providing cam surfaces; a guide member carried by said plunger member and adapted to successively engage said cam surfaces to partially rotate said plunger member when said electro-magnetic means is energized, the notches of said secondary member including slots into which said guide member slides, the effective depth of said slots determining the amount of separation of said plunger member and said seat; and adjustable means for determining the maximum position to which said plunger member moves after each partial rotation thereof.

12. In an electrically operated valve, the combination of: a valve body providing a seat therein; a plunger member normally engaging said seat; electromagnetic means for moving said plunger away from said seat; primary and secondary cam members carried by said valve body, said cam members having disaligned notches providing cam surfaces; a guide member carried by said plunger member and adapted to successively engage said cam surfaces to partially rotate said plunger member when said electromagnetic means is energized, the notches of said secondary member including slots into which said guide member successively slides; and adjustable members extending into certain of said slots for determining the maximum depth to which said guide member may enter said slots.

13. In an electrically operated valve, the combination of: a valve body providing a seat therein; a plunger normally engaging said seat; electromagnetic means for moving said plunger from said seat; primary and secondary cam members carried by said valve body, said cam members having disaligned notches providing cam surfaces; a guide member carried by said plunger and adapted to successively engage said cam surfaces to partially rotate said plunger when said electromagnetic means is energized, said secondary cam member having slots adapted to slidably receive said guide member, the effective depth of said slots determining the degree of separation of said plunger and said seat; and adjustable means for determining the maximum position to which said plunger moves after each partial rotation thereof.

14. In an electrically operated valve, the combination of: a valve body providing a seat therein; a plunger member normally forced toward said seat; electromagnetic means for moving said plunger member in a direction away from said seat; primary and secondary cam members carried by said valve body, said cam members having disaligned notches providing cam surfaces; a guide member carried by said plunger member and adapted to successively engage said cam surfaces to partially rotate said plunger member when said electromagnetic means is energized; and means adjustable exteriorly of said valve body for determining the maximum position to which said plunger member moves after each partial rotation thereof.

15. In an electrically operated valve, the combination of: a valve body providing a seat therein; a plunger member normally engaging said seat; electromagnetic means for moving said plunger member away from said seat; primary and secondary cam members carried by said valve body, said cam members having disaligned notches providing cam surfaces; a guide member carried by said plunger member and adapted to successively engage said cam surfaces to partially rotate said plunger member when said electromagnetic means is energized; and means extending exteriorly of said valve body and adapted for adjustment to determine the maximum position to which said plunger member moves after each partial rotation thereof.

16. A combination as defined in claim 13 in which the adjustable means includes members extending into each of said slots to determine the limiting position of said plunger between rotations.

17. In combination: a body; a rod slidable in said body; primary and secondary cam members supported by said body and surrounding said rod, said cam members having disaligned notches defining longitudinal slots of different effective depth; guide means on said rod adapted to engage said cam members and successively enter said notches when said rod is reciprocated; and adjustable means extending into each of said slots to determine the limiting position of said rod between reciprocations.

18. A combination as defined in claim 17 in which said adjustable means is actuated exteriorly of said body.

19. In a valve structure the combination of: a valve means; movable means for controlling said valve means; a plurality of adjustable stop members; and means for moving said movable means successively into engagement with said stop members.

20. In a valve structure the combination of: a valve means; movable means for controlling said valve means, said movable means including a plurality of adjustable stop members; and means for moving said movable means successively into engagement with said stop members.

21. In a valve structure the combination of: a valve; means for moving said valve from closed to open position; a plurality of adjustable stop members; an engager on said valve; and means for operating said valve for moving said engager into engagement with one of said adjustable stop members.

22. In an electrically operated valve, the combination of: a valve body having a seat therein; a plunger adapted for rotative and reciprocative movement in the valve body; a valve member rotatably mounted on the plunger and adapted to engage the seat; means, including an electro-magnet, for causing reciprocative and rotative movement of the plunger to control movement of the valve member relative to the seat; and spring means to yieldingly hold the valve member in engagement with the seat, said yielding means and rotative connection between the plunger and the valve member being such that rotation of the plunger is permitted and rotation of the valve member is prevented when the valve member is lifted off the seat.

23. In an electrically operated valve, the combination of: a valve body having a seat therein; a plunger adapted for rotative and reciprocative movement in the valve body; a valve member rotatably mounted on the plunger and adapted to engage the seat; means, including an electro-magnet, for causing reciprocative and rotative movement of the plunger; spring means to yieldingly press the valve member towards the seat; and means associated with the plunger and valve body to hold the valve member spaced from the valve seat at selected points in the rotation of the plunger, the rotative connection between the plunger and the valve member being such that rotation of the plunger is permitted when the valve member is held spaced from the seat.

24. In combination: a body; a rod slidable in said body; primary and secondary cam members supported by said body and surrounding said rod, said cam members having disaligned notches, the notches of said secondary cam member including longitudinal slots; adjustable members extending into each of said slots to determine the effective depth thereof; and a guide member on said rod, said guide member engaging said cam members and successively entering said notches when said rod is reciprocated, the effective depth of said slots determining the limiting position of said rod between reciprocations.

In testimony whereof, I have hereunto set my hand at Los Angeles, California, this 20th day of September, 1928.

GABRIEL W. ANDERSON.